United States Patent [19]

Bowen et al.

[11] Patent Number: 4,717,620
[45] Date of Patent: Jan. 5, 1988

[54] DECORATIVE COATINGS PROVIDING A MULTICOLOR, TEXTURED SURFACE

[75] Inventors: Thomas N. E. Bowen, Wooburn Green; Jonathan A. Graystone, Maidenhead; Andrew J. W. Hobbs, Reading, all of England

[73] Assignee: Imperial Chemical Industries PLC, London, England

[21] Appl. No.: 828,745

[22] Filed: Feb. 12, 1986

[30] Foreign Application Priority Data

Feb. 22, 1985 [GB] United Kingdom ................. 8504632
Mar. 27, 1985 [GB] United Kingdom ................. 8507949

[51] Int. Cl.⁴ ...................... B32B 5/16; B32B 27/00; C08K 7/16; C09D 5/29
[52] U.S. Cl. .................................. 428/323; 428/143; 428/147; 428/327; 523/171; 523/223
[58] Field of Search ............... 428/143, 147, 323, 327; 523/171, 223

[56] References Cited

U.S. PATENT DOCUMENTS

| | | | |
|---|---|---|---|
| 2,591,904 | 4/1952 | Zola | 106/238 |
| 3,458,328 | 7/1969 | Zola | 106/208 |
| 4,009,136 | 2/1977 | Lewandowski et al. | 523/171 |
| 4,376,654 | 3/1983 | Zola | 524/13 X |
| 4,489,174 | 12/1984 | Karickhoff | 521/54 |

FOREIGN PATENT DOCUMENTS

| | | | |
|---|---|---|---|
| 1312083 | 4/1973 | United Kingdom . | |
| 1332469 | 10/1973 | United Kingdom . | |
| 1395065 | 5/1975 | United Kingdom . | |
| 1501437 | 2/1978 | United Kingdom . | |
| 2078243 | 1/1982 | United Kingdom | 523/171 |
| 2171413 | 9/1986 | United Kingdom | 523/223 |

Primary Examiner—John E. Kittle
Assistant Examiner—Susan S. Rucker
Attorney, Agent, or Firm—Cushman, Darby & Cushman

[57] ABSTRACT

A multitone or multicolor decorative, textured coating on a substrate comprises rigid, spheroidal polymeric beads distributed in a random pattern and embedded in a coherent coating film comprising a film-forming polymer. The beads may be colored and are of a defined size relative to the coherent coating film thickness and there is a contrast in tone or color between the coherent coating film and at least some of the beads. The coating is obtained on a substrate by applying to the substrate with a roller applicator a coating composition which contains beads of defined size.

12 Claims, No Drawings

DECORATIVE COATINGS PROVIDING A MULTICOLOR, TEXTURED SURFACE

This invention relates to decorative, multitone or multicolour, textured coatings and to coating compositions which are suitable for producing such coatings on a substrate, particularly when using a roller applicator.

Multitone or multicolour decorative coatings are known and they may be produced in one or more separate steps. One type of multicolour coating, which is described for example in U.S. Pat. Nos. 2,591,904 and 3,458,328, is produced from a composition which comprises a dispersion or solution of a film-forming polymer and discrete emulsified liquid globules of a material which is coloured as required. When dried on a substrate the globules provide random regions of the the background coating film which is provided by the film-forming polymer. The liquid globules in this type of composition may comprise, for example, a solution of a nitrocellulose lacquer.

The major problem with such paints is the tendency for the pigmented globules to be sheared when the paints are applied to a substrate by a roller applicator. This leads to elongation, break-up and intermixing of the globules, which produces a most unattractive finish. Their successful application is thus limited to spraying and the coatings produced have a coarse, unattractive, lumpy texture due to the dried globules.

Textured decorative coatings are also known and in general these coatings are produced because of the pleasing relief appearance which they impart to a substrate, together with some ability to mask minor defects in a substrate.

The present invention provides a decorative coating, for example such as would be suitable on a household wall or ceiling surface, which is of a multitone or multicolour appearance and which is textured in the sense that it has a surface which is pleasing to the touch, for example resembling in feel that of suede, rather than having a pronounced relief appearance.

According to this invention we provide a multitone or multicolour, decorative, textured coating on a substrate, the coating comprising 15–95% by volume, based on the total dry coating volume, of rigid, spheroidal, polymeric beads distributed in a random pattern and embedded in a coherent dry coating film which comprises a film-forming polymer, wherein:

(a) the rigid polymeric beads have an effective maximum diameter (as herein defined) which is within the range 1.2 to 3.5 × (the overall average thickness of the coherent dry coating film—which is defined as the quotient of the total weight of the coherent coating film per unit area divided by the density of the total coherent coating film) but where up to 5% by weight of the individual beads, based on the total weight of beads, may have a diameter greater than the effective maximum diameter;

(b) the overall size of the beads is such that 90% by weight of the beads have a diameter which is within the range 0.6 to 3.0× (the overall average thickness of the coherent dry coating film), (c) at least 40% by weight of the beads have a diameter which is within the range 0.5 to 1.0× (the effective maximum diameter of the beads); and (d) there is a contrast in tone or colour between the coherent dry coating film and at least some of the rigid polymeric beads;

Preferably, the coating has a pleasant, fine texture to the touch.

Preferably also, the coating has an appearance such that the perceived colour strength or hue varies with the angle at which it is viewed (sometimes termed 'flip'). This change in appearance occurs as the angle of viewing the coating is changed, for example by changing the direction of viewing from one which is normal to the coating to one which is almost parallel to the coating. This change is usually most apparent to the coating. This change is usually most apparent when the source of light is in front of the viewer and is weakest when the light source is behind the viewer.

We have found that a decorative coating as defined above can be provided on a substrate by applying to the substrate, preferably by means of a roller applicator, a coating composition which comprises a dispersion of a filmforming polymer and rigid, spheriodal polymeric beads in a liquid medium wherein:

(a) the rigid polymeric beads have an effective maximum diameter (as herein defined) which is within the range 1.2 to 3.5× (the overall average thickness of the coherent dry coating film as herein defined); but where up to 5% by weight of the individual beads may have a diameter greater than the effective maximum diameter);

(b) the overall size of the beads is such that 90% by weight of the said beads have a diameter which is within the range 0.6 to 3.0× (the overall average thickness of the coherent dry coating film);

(c) at least 40% by weight of the heads have a diameter which is within the range 0.5 to 1.0× (the effective maximum diameter of the beads);
and optionally, (d) the dispersion comprises such ingredients other than the rigid polymeric beads, for example pigment, as will provide in a dry coating to be produced a contrast in tone or colour with at least some of the rigid polymeric beads.

Preferably the liquid medium of the coating composition is an aqueous medium.

Preferably the film-forming polymer is a latex polymer.

The rigid, spheroidal polymeric beads to be used in the coatings of this invention are preferably prepared directly by polymerisation processes but may also be prepared indirectly from, for example by grinding, a preformed polymer. Emulsion or suspension polymerisation processes are particularly useful when the coating composition is to be water-based. Preparation by these processes, which are further discussed below, provides beads which are substantially spherical, with a weight size distribution which approximates to a Gaussian or normal distribution. Therefore it is necessary to define the size of beads which are desired in the present coatings in terms of the mixtures of bead sizes which are obtained from these preferred processes. We have found that the preferred size of the beads is directly related to the thickness of the dry coherent coating film (as herein defined) in which they are embedded.

In general, dry coating films which are conventionally produced from decorative coating compositions, for example such as would be produced from an emulsion paint on a household wall or ceiling, have an overall average thickness in the range 20–50 microns. We have found that the rigid, polymeric beads present in the present coating and coating compositions should for most purposes have an "effective maximum diameter" which is related to the thickness of conventional coating films and which is therefore broadly defined as lying in the range 1.2× (minimum conventional film thickness) to 3.5× (maximum conventional film thickness i.e. 24 to 175 microns. Beads of this "effective maximum diameter" are those that for a given thickness of the coherent dry coating film are the optimum maximum bead size at which the specified coating can be obtained, since the use of beads of diameter greater than this leads to an undesirable roughness of the coating surface. A preferred overall average coherent film thickness is in the range 30–45 microns and the most preferred effective maximum bead diameter is then in the range 90–150 microns. Preferably at least 40% by weight of the beads have a diameter which is within the range 30–150 microns. The optional presence of up to 5% by weight of individual beads which may have a diameter greater than the effective maximum diameter is intended to take into account the normal Gaussian distribution of bead diameter.

It may be preferred, in order to achieve, for example, a difference in appearance, to use blends of two or more different samples of beads which have been prepared separately and which have different distributions of bead size. For example, one sample of beads may contain beads which have one effective maximum diameter and another sample may contain beads of a lower effective maximum diameter.

Preferably at least some of and in many cases preferably all of the beads will be coloured. Some of the beads may be of one colour (in which term we include white when a white pigment is present) and other beads may be of one or more different colours. Colour is introduced into the beads during their formation, for example by the use of an oil-soluble dyestuff or an insoluble pigment. Dyed beads are normally transparent whereas pigmented beads may be transparent or opaque and these differences may lead to differences in the colour which is perceived.

Typical suspension polymerisation processes which may be employed to prepare rigid, spheroidal polymeric beads suitable in the decorative coatings of this invention are described in the Examples. In general suspension polymerisation is preferred to emulsion polymerisation. These processes are generally conventional. In certain cases it may be advantageous for the beads to contain vesicles and methods of preparing vesiculated beads which may also contain pigment are described, for example, in British Pat. No. 1,332,469. Pigment may also be added at any suitable stage in an emulsion or suspension polymerisation process to produce pigmented non-vesiculated polymeric beads.

Suitable water-insoluble polymers of which the beads may be comprised include addition polymers, for example polyethylene and polypropylene, and polymers and copolymers of vinyl chloride, styrene, lower alkyl acrylates and methacrylates; polycondensation polymers, for example polyesters, polyamides and amine-formaldehydes; unsaturated polyester resins copolymerised with styrene. Mixtures of polymers may also be used.

When a latax polymer is present in the coating compositions of this invention to provide the coherent film in which the solid polymeric particles are embedded it is in general similar to latax polymers, for example emulsion polymers, which are employed in coating compositions suitable for producing other types of decorative coating. Suitable polymers include homopolymers and copolymers of vinyl esters and ethers, lower alkyl acrylates and methacrylates, lower olefins, halogenated vinyl monomers; and styrene/butadiene copolymers. Typical monomers include vinyl acetate, vinyl propionate, vinyl esters of saturated tertiary monocarboxylic acids (for example acids commercially available from Shell Chemicals under the Registered Trade Mark "Versatic" acid), (meth)acrylic acid, methyl methacrylate, ethyl acrylate, 2-ethyl hexyl acrylate, vinyl chloride and vinylidena chloride. Polymers, other than latex polymers, which may be used as the film-forming polymer include polyesters, alkyds, polyurethanes and addition polymers not of the latex type. These polymers may be present in a liquid medium either as a solution or as a dispersion. Although an aqueous medium, optionally with a minor amount of non-aqueous liquid present, is in general preferred, a non-aqueous medium may also be used.

The coherent film of the final coating may be modified by incorporating with the film-forming polymer any of the materials which it is conventional to use in coatings, for example pigment, extender, thickener, structuring modifier, coalescing solvent, surfactant, dispersant and biocide.

The total, individual components of the coating composition are chosen, bearing in mind the nature—for exaple the colour and size—of the rigid polymeric beads so that a desired multitone or multicolour coating is achieved according to the invention when applied by the preferred applicator which is of the type usually referred to as a roller applicator.

In addition it is necessary to achieve rheological properties in the composition which are appropriate to the conditions under which, and to the substrate to which it is to be applied.

In general the total volume content in the coating composition (and in any coating produced therefrom) of beads and any pigment and extender present is expressed in relation to the volume of polymer present as a pigment volume concentration; i.e. the quotient of the total volume of bead, pigment and extender divided by the total volume of polymer, bead, pigment and extender expressed as a percentage. Thus the pigment volume concentration will lie in the range 15–95%. The volume concentration of beads will generally lie in the range 15–95%.

Preferably the coating provided by this invention has a multicolour appearance which is achieved by including in the dispersion of the film-forming polymer which is to form the final coherent film, a pigment or pigments which provide a contrast with the rigid polymeric beads as previously defined. Thus an aqueous polymer latex, for example, may be pigmented with a white pigment so that the final coherent film is white, and the polymeric beads may be dyed or pigmented with a contrasting colour. Alternatively a multitone appearance may be achieved, for example, without the use of different colours by the presence or absence of a white pigment in the coherent film or the beads; or alternatively the coherent film and the beads may be of different tones of the same colour.

We believe, but without limitation, that the application of the composition of this invention to a substrate by a roller applicator provides a coating of unique appearance; and that this coating may be defined as one in which there are visually resolvable domains of rigid beads, the domains being of differing bead density and hence of different colour or tone density.

Thus this invention also provides a process of obtaining a decorative coating on a substrate wherein a coating composition as defined above is applied to the substrate from a roller applicator.

It may be preferred to obtain a desired coating by applying the coating composition in two or more steps, e.g. by applying a first coating and when this is dry then applying a second coating.

Further details of the formulation of the coating compositions which provide the decorative coatings of this invention are provided in the Examples.

The invention is illustrated by the following Examples in which parts and percentages are by weight unless otherwise stated.

EXAMPLE 1

(a)

Preparation of dyed, polymeric styrene/polyester beads

| Formulation | parts |
|---|---|
| A Demineralised water | 35.69 |
| B Poly(vinyl alcohol) (as a 3% solution in water) | 5.67 |
| C Hydroxyethyl cellulose (as a 15% solution in water) | 11.43 |
| D Styrene | 3.00 |
| E Benzoyl peroxide (70% solids content) | 1.09 |
| F Polyester* (as a 70% by weight solution in styrene) | 33.92 |
| G Fat Red G dyestuff | 0.21 |
| H Styrene | 3.67 |
| I Diethylaniline | 0.20 |
| J Poly(vinyl alcohol) (as a 15% solution in water) | 5.11 |

(*prepared from propylene/glycol/maleic anhydride/phthalic anhydride) = 31/18/22)

Items A,B and C of the formulation were well mixed in a reaction vessel. Items D and E were separately mixed to form a solution. This solution was then well mixed first with Item F, then with Item G and then with Item H. The separate mixture of Items D,E,F,G and H was transferred to the reaction vessel containing A, B and c with rapid stirring over about 4 minutes, and stirring maintained for a further 10 minutes. Samples were taken of the resulting emulsion and the "effective maximum diameter" of the emulsion disperse phase was determined by optical microscopy. The use of a Coulter counter is an alternative technique of measurement. Stirring was continued until the desired "effective maximum diameter" was achieved. Item I was then added and stirring continued for 1 minute when Item J was added and stirring reduced to a minimum. The temperature was raised to 45° C., and after the resulting exotherm had passed the temperature was maintained at 45° for 45 minutes.

The resulting slurry of red polymeric beads (weight solids content 40%) had an "effective maximum diameter" (emd) of 80 microns (90% by weight of beads being of diameter in the range 35 to 80 microns and 40% by weight of the beads being of diameter in the range 50 to 80 microns). Using a similar procedure, beads having an "effective maximum diameter" of 115 microns were also produced.

(b)

Preparation of coating compositions and application to a substrate

| Formulation | parts |
|---|---|
| A Slurry of red beads from (a) above (40% solids) | 32.1 |
| B Ethylene glycol | 1.93 |
| C White spirit | 1.93 |
| D Biocide, surfactant | 0.46 |
| E Dispersant, antifoam agent | 1.15 |
| F Titanium dioxide | 21.18 |
| G Extender | 15.98 |
| H Acrylic latex (52% solids) | 17.37 |
| I 0.880 ammonia | 0.36 |
| J Alkali-soluble thickener (commercially available as "Primal" G110, 22% solids content) | 0.60 |
| K Antifoam agent | 0.12 |
| L Structure modifier | 0.12 |

Items A,B,C,D and E were added to a high speed disperser and dispersed at 1100 r.p.m. Items F and G were added to the disperser and dispersion continued at 1900 r.p.m. for 20 minutes. 3.86 parts of water and 0.26 parts antifoam agent were added and dispersed for a further 5 minutes at 1900 r.p.m. A further 2.82 parts of water were added to the product, which was then transferred to a low speed mixer. Items H,I,L and K were added and stirred for 30 minutes. Item L was then added.

The final product had a volume solids content of 45% and a weight solids content of 60%. The Pigment Volume Concentration (PVC) (titanium dioxide+extender) in the coherent film (i.e. excluding bead volume) was 57%. The bead volume concentration in the total composition was 33%.

Separate coating compositions were made using the 80 micron and the 115 micron effective maximum diameter) (emd), dyed beads respectively. When these compositions were applied to a non-absorbent substrate by a roller to provide a dry coating film of overall average coating thickness 45 microns, it was found that both the 80 micron 'emd' beads and the 115 micron 'emd' beads yielded coatings which were pleasant to the touch and had a satisfactory appearance.

EXAMPLE 2

Two samples of rigid polymeric beads of effective maximum diameter 80-90 microns and satisfying the other defined criteria as to size, were each prepared by the procedure of Example 1(a) except that one sample contained the same red dyestuff and the other sample was coloured with a blue dyestuff. A coating composition was prepared by the procedure of Example 1(b) except that the slurry A consisted of 7.9 parts of the red bead slurry and 23.7 parts of a blue bead slurry.

When the coating composition was applied to a non-absorbent substrate by a roller applicator there was produced a dry coating film of overall average coating thickness 45 microns which had an attractive multicolour appearance and an attractive suede-like feel to the touch.

EXAMPLE 3

A coating composition containing dyed red beads of effective maximum diameter 80 microns was produced similar to that produced in Example 1 but in which there was used a higher proportion (1.4 parts) of the structure modifier and the alkali-soluble thickener was replaced by sodium carboxy methyl cellulose (3.8 parts) When the resulting highly structured paint was applied to a substrate by a roller applicator a coating film of overall average thickness 40 microns was produced which had an attractive multicolour appearance and an attractive suede-like feel to the touch.

EXAMPLE 4

A coating composition was produced similar to that produced in Example 1(b) except that it contained pigmented, rigid polyurethane microspherical beads commercially available under the Trade Mark "Decosilk". These microspherical beads had an effective maximum diameter of 90 microns and are believed to satisfy the other size criteria defined for the useful beads.

When applied to a non-absorbent substrate by a roller applicator a coating film of overall average thickness 40 microns was produced which had an attractive multicolour appearance and an attractive suede-like feel to the touch.

We claim:

1. A multitone or multicolour, decorative, textured coating on a substrate, the coating comprising 15–95% by volume, based on the total dry coating volume, of rigid, spheroidal, polymeric beads distributed in a random pattern and embedded in a coherent dry coating film which comprises a film-forming polymer, wherein:
   (a) the rigid polymeric beads have an effective maximum diameter (as herein defined) which is within the range 1.2 to 3.5 × (the overall average thickness of the coherent dry coating film - which is defined as the quotient of the total weight of the coherent coating film per unit area divided by the density of the total coherent coating film) but where up to 5% by weight of the individual beads, based on the total weight of the beads, may have a diameter greater than the effective maximum diameter;
   (b) the overall size of the beads is such that 90% by weight of the beads have a diameter which is within the range 0.6 to 3.0 × (the overall average thickness of the coherent dry coating film):
   (c) at least 40% by weight of the beads have a diameter which is within the range 0.5 to 1.0 × (the effective maximum diameter of the beads); and
   (d) there is a contrast in tone or colour between the coherent dry coating film and at least some of the rigid polymeric beads.

2. A coating according to claim 1 which has a fine texture.

3. A coating according to claim 1, wherein the overall average coherent film thickness is in the range 30–45 microns and the effective maximum diameter of the beads is in the range 90–150 microns.

4. A coating according to claim 3, wherein at least 40% by weight of the beads have a diameter which is within the range 30–150 microns.

5. A coating composition suitable for application to a substrate by a roller applicator to produce a multitone or multicolour, decorative, textured coating, which comprises a dispersion of a film-forming polymer and rigid, spheroidal polymeric beads in a liquid medium wherein:
   (a) the rigid polymeric beads have an effective maximum diameter (as herein defined) which is within the range 1.2 to 3.5 × (the overall average thickness of the coherent dry coating film as herein defined) but where up to 5% by weight of the individual beads may have a diameter greater than the effective maximum diameter;
   (b) the overall size of the beads is such that 90% by weight of the said beads have a diameter which is within the range 0.6 to 3.0 × (the overall average thickness of the coherent dry coating film);
   (c) at least 40% by weight of the beads have a diameter which is within the range 0.5 to 1.0 × (the effective maximum diameter of the beads).

6. A coating composition according to claim 5, wherein the liquid medium is an aqueous medium.

7. A coating composition according to claim 6, wherein the film-forming polymer is a latex polymer.

8. A coating composition according to claim 5, wherein the pigment volume concentration is in the range 15–95%.

9. A coating composition according to claim 5, wherein at least some of the beads are coloured.

10. A coating composition according to claim 5, wherein the beads are prepared by suspension polymerisation.

11. A method of obtaining a decorative coating on a substrate, wherein a coating composition according to claim 5 is applied to the substrate from a roller applicator.

12. A coating composition according to claim 5 which comprises a pigment which will provide, in the dry coating to be produced, a contrast in tone or colour with at least some of the rigid polymeric beads.

* * * * *